FIG. I.

INVENTORS
EDWIN L. SHAW
JAMES R. PARR
BY Herschel C. Omohundro
attorney

May 20, 1958 J. R. PARR ET AL 2,835,228
PRESSURE COMPENSATOR FOR VARIABLE VOLUME PUMPS
Filed Dec. 7, 1954 5 Sheets-Sheet 3

INVENTORS
EDWIN L. SHAW
BY JAMES R. PARR

Herschel C. Omohundro
attorney

May 20, 1958

J. R. PARR ET AL 2,835,228

PRESSURE COMPENSATOR FOR VARIABLE VOLUME PUMPS

Filed Dec. 7, 1954

INVENTORS
EDWIN L. SHAW
BY JAMES R. PARR

Herschel C. Omohundro
attorney

INVENTORS
EDWIN L. SHAW
JAMES R. PARR

United States Patent Office 2,835,228
Patented May 20, 1958

2,835,228

PRESSURE COMPENSATOR FOR VARIABLE VOLUME PUMPS

James R. Parr and Edwin L. Shaw, Columbus, Ohio, assignors, by mesne assignments, to American Brake Shoe Company, New York, N. Y., a corporation of Delaware Application December 7, 1954, Serial No. 473,504

1 Claim. (Cl. 121—41)

This invention relates generally to hydraulics and is more particularly directed to fluid pressure energy translating devices and control mechanisms therefor.

Still more particularly the invention is directed to a pressure compensator for use on a variable volume pump of the type having a movable member for varying the volume and means normally tending to move such member toward a full volume position.

An object of the invention is to provide a pressure compensator for a variable volume pump which will operate to reduce the volume of fluid delivered by the pump after a predetermined pressure has been approximately reached, the volume being reduced to that amount required to replenish leakage and/or fluid used in the hydraulic system and still maintain the pressure at a predetermined value, the pressure at which the reduction of volume is initiated being substantially that of the pressure desired in the system, in other words, the differential between the pressure at which the reduction in volume is initiated and the desired pressure for operating the system being very narrow.

Another object of the invention is to provide a compensator for a variable volume pump of simple design which will give positive action, will be stable in operation and require a minimum of attention by the user of the pump to which it is applied.

Another object of the invention is to provide a compensator for a variable volume pump of the type having a movable volume varying member and means tending to urge such member toward a full volume position, the compensator having a piston operated by fluid pressure to move the volume varying mechanism toward a zero volume position and a follow type servo valve which cooperates with the piston to control the flow of fluid pressure to and from the piston chamber to effect control movement of the piston, the servo valve being responsive to fluid pressure in the output port of the pump to admit fluid to the piston chamber of the operating piston, and responsive to resilient means which resists movement of said valve by such fluid pressure and tends to move the valve relative to the piston, the latter movement serving to interrupt the application of fluid pressure to the piston and to establish communication between the piston chamber and exhaust thus permitting the discharge of fluid from the piston chamber during the retractive movement of the compensator piston.

Another object of the invention is to provide a pressure compensator for a variable volume pump of the type having a movable volume varying mechanism and means normally tending to move the same toward full volume position, such compensator having a member forming a piston chamber and a control mechanism chamber, a piston movable in such piston chamber, the piston forming a valve chamber and a passage establishing communication between the piston chamber and exhaust, a valve being positioned in such valve chamber and having a portion extending into the control mechanism chamber, the valve also providing a passage to establish communication between the control mechanism chamber and the valve chamber, means being provided to form a passage also to establish communication between the control mechanism chamber and the output port of the pump, the valve being responsive to a predetermined fluid pressure in the output port of the pump to move in the valve chamber to establish communication between the control mechanism chamber and the piston chamber whereby fluid pressure will be introduced into the latter to effect the movement of the piston and consequently the movement of the volume varying member toward a zero volume position, said valve moving with the piston but having such movement opposed by a resilient means, such as a spring, which determines the differential between the pressure at which the operation of the volume control mechanism is initiated and that at which the pump ceases to deliver any fluid in excess of the volume required to replenish system requirements and leakage, movement of the valve by such spring when the pressure in the pump output port starts to fall serving to establish communication between the piston chamber and exhaust so that fluid in the piston chamber may be vented to permit the operation of the means tending to move the volume varying mechanism toward a full volume position and return the actuating piston toward a retracted position for the next operation.

A still further object of the invention is to provide the compensator, set forth in the preceding paragraph, with means in the control mechanism chamber for varying the pressure at which the valve commences to respond to fluid pressure existing in the output port of the pump.

It is a still further object of the invention to provide the compensator, set forth in the two preceding paragraphs, with a resilient means between the piston and the valve to normally tend to move the valve toward a position in which the piston chamber is vented to exhaust so that, when no fluid pressure or a fluid pressure less than a predetermined value exists in the output port of the pump, the volume varying mechanism will be maintained in a full volume position by the means provided in the pump for moving it to such position.

Another object of the invention is to provide a pressure compensator for a variable volume pump, such pressure compensator having a piston responsive to fluid pressure to move the volume varying mechanism of the pump toward a zero volume position and a follow-type servo valve for cooperation with the piston to govern the flow of operating fluid pressure to the piston chamber and from the piston chamber to exhaust, resilient means being provided to normally resist the operation of the valve to admit fluid pressure to the piston chamber until a predetermined fluid pressure is reached in the output port of the pump, means being provided in association with the valve and spring to vary the preloading of the spring and consequently the pressure at which the valve will start to admit pressure fluid to the piston chamber.

Further objects and advantages of the present invention will be apparent from the following description, reference being had to the accompanying drawings wherein a preferred form of embodiment of the invention is clearly shown.

Figure 1:
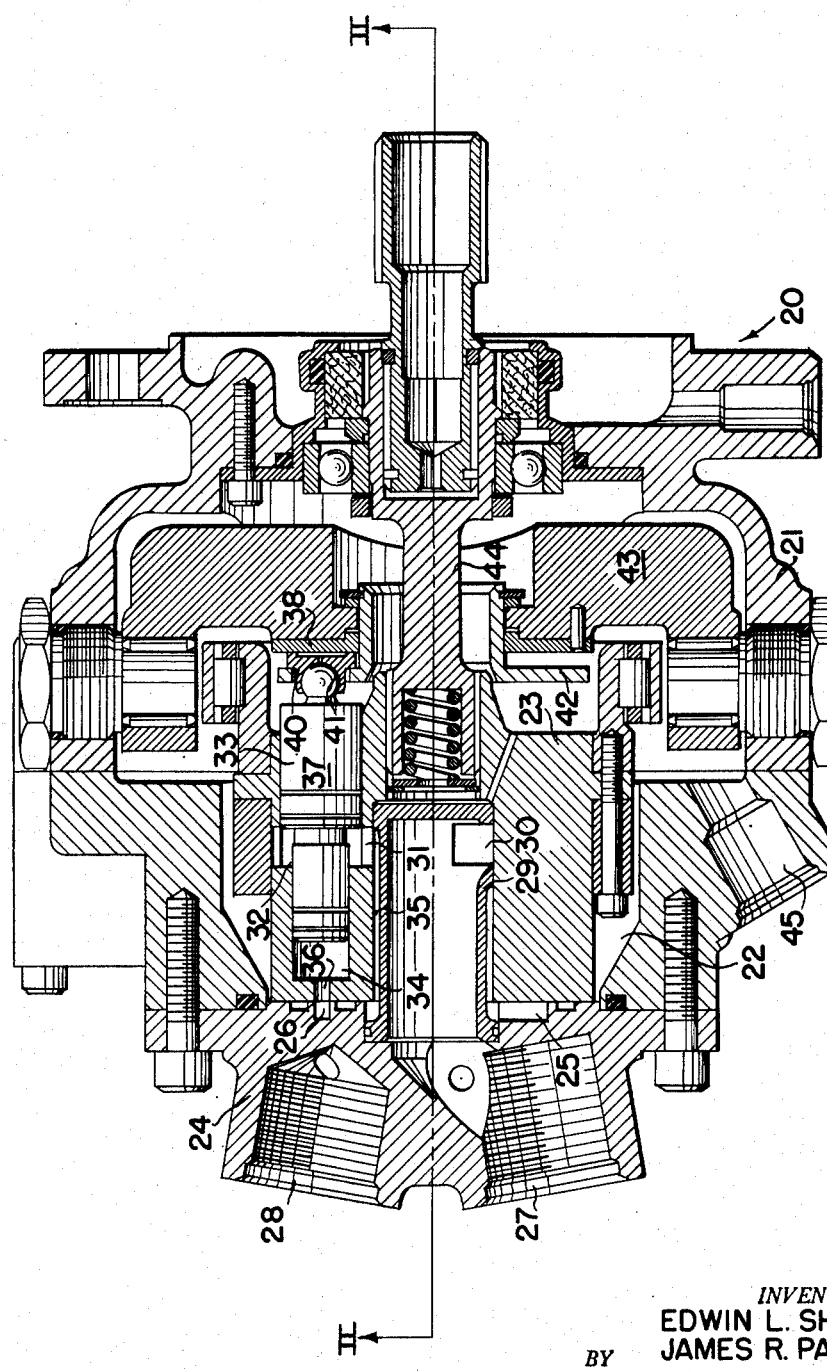
Fig. 1 is a longitudinal sectional view taken through an aircraft pump of the type having a volume varying mechanism and means tending to move the same toward a full volume position, the pump being provided with a pressure compensator formed in accordance with the present invention.
Figure 2:
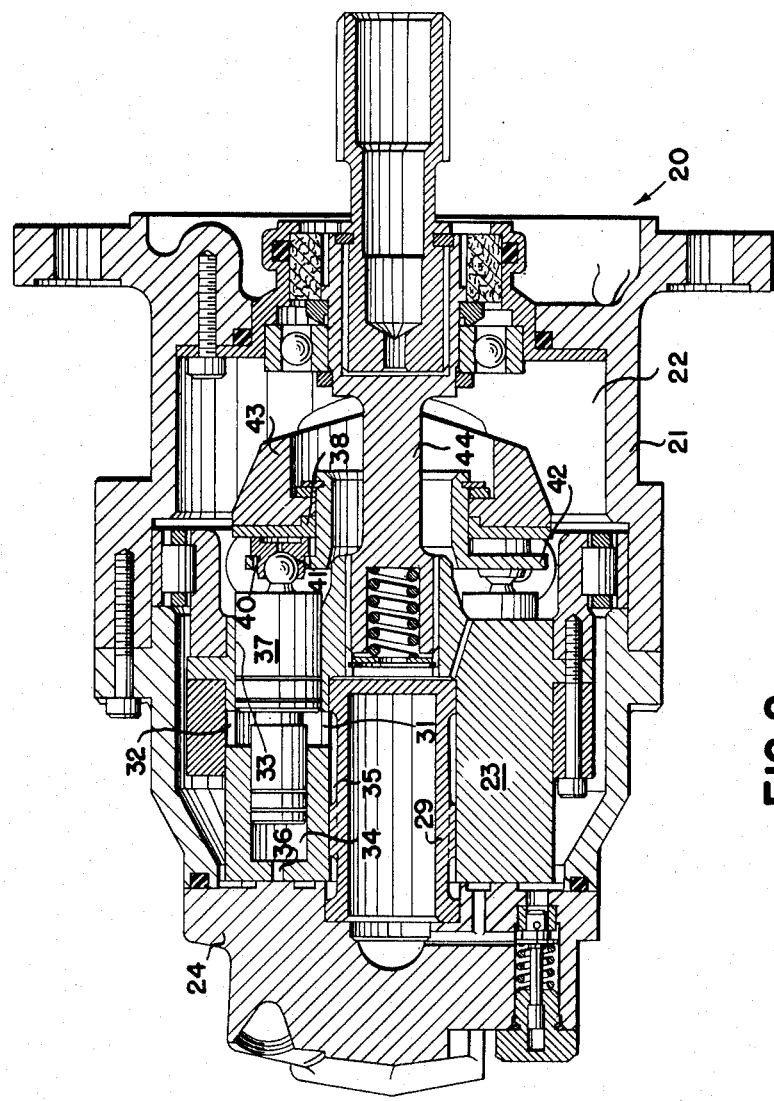
Fig. 2 is a longitudinal sectional view taken through the pump shown in Fig. 1 on the plane indicated by the line II—II of such figure.
Figure 3:
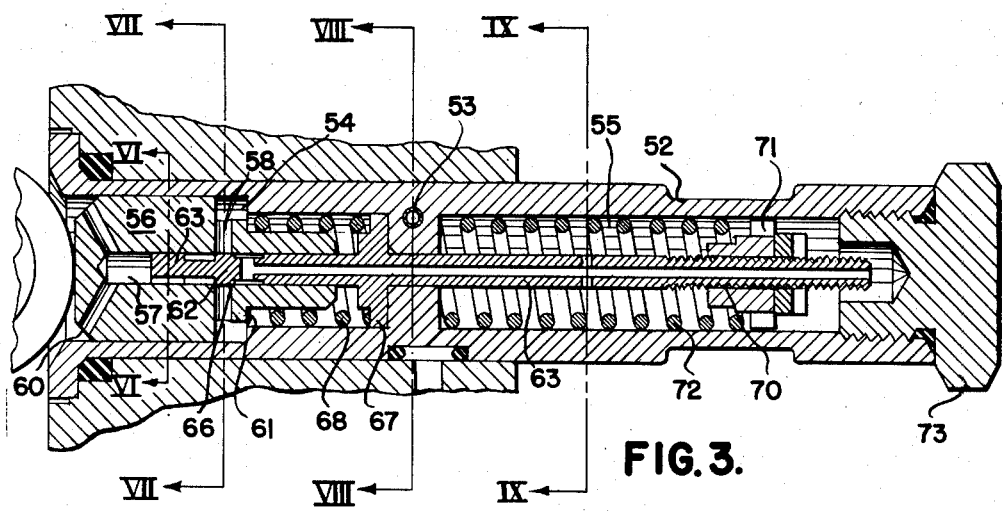
Fig. 3 is an enlarged longitudinal sectional view taken through a pressure compensator formed in accordance with the invention showing parts therein in full volume position.
Figure 6:
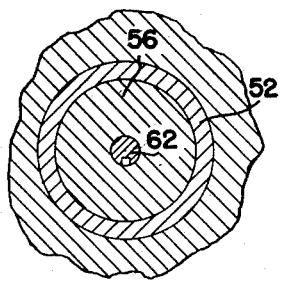
Figure 8:
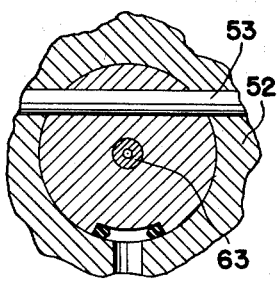
Figure 7:
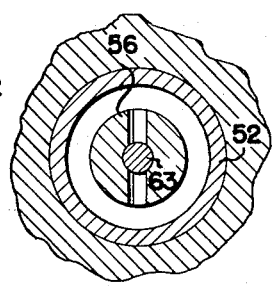

Figs. 6 to 9, inclusive, are vertical transverse sectional views taken through the compensator on the planes indicated by the lines VI—VI, VII—VII, VIII—VIII, and IX—IX, respectively, of Fig. 3.

Figure 10:
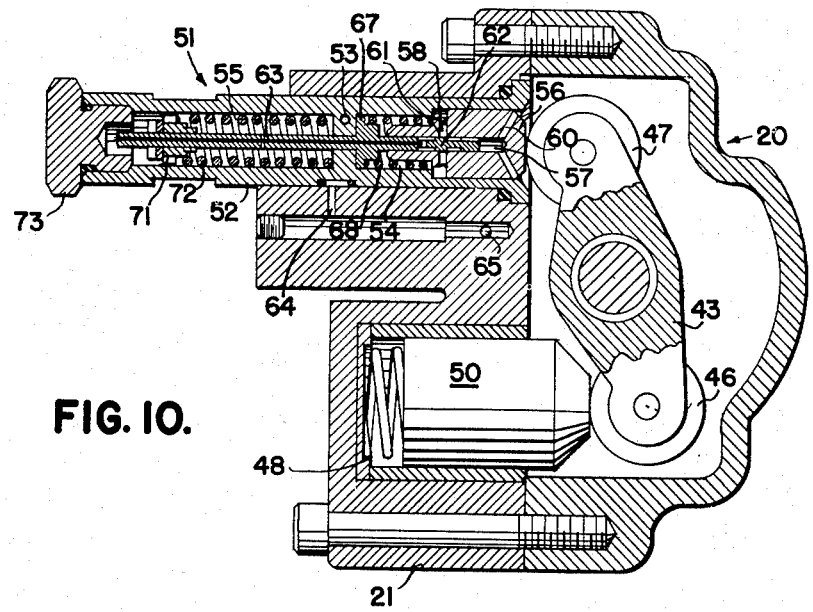
Figure 11:
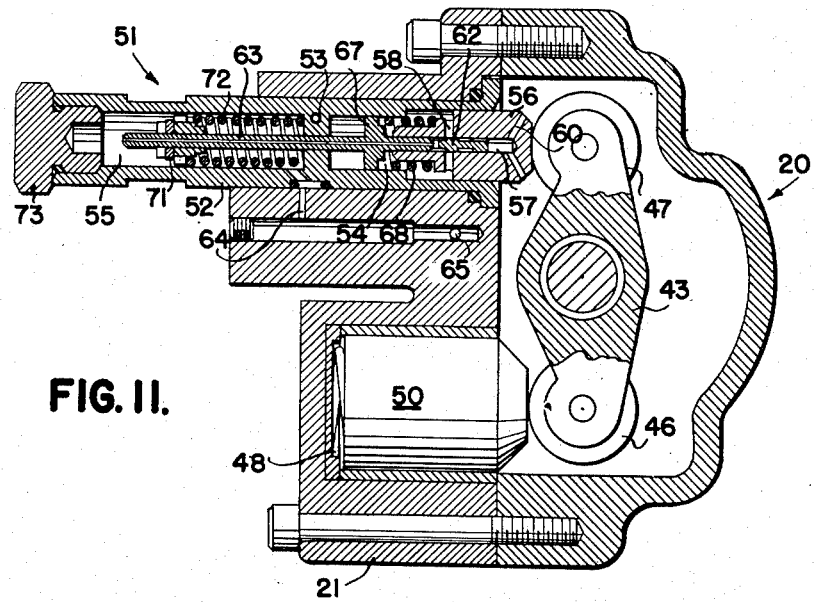

Figs. 10 and 11 are longitudinal sectional views taken through the pressure compensator, the volume varying member and the means for urging the latter toward a full volume position, Fig. 10 showing the parts in the latter position and Fig. 11 showing them in the zero volume position.

Figure 12:
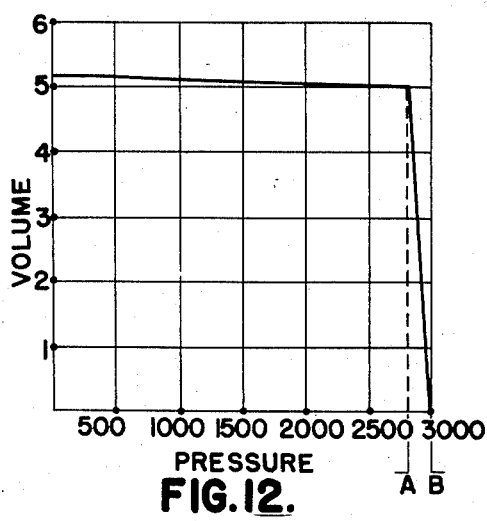
Figure 9:
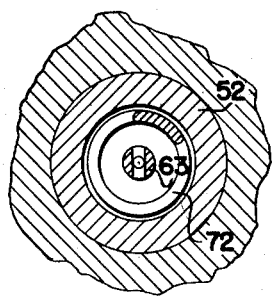

Fig. 12 is a graph having a curve imposed thereon to show the volume to pressure ratio of a pump provided with a compensator formed in accordance with the present invention.

Referring more particularly to the drawings, the numeral 20 designates a fluid pressure energy translating device to which the invention has been applied. In this instance, the fluid pressure energy translating device comprises a variable volume aircraft pump of the type shown in the co-pending application of Leroy Bonnette and Cecil Adams, Serial No. 234,634, filed June 30, 1951, now Patent No. 2,737,899 dated March 13, 1956, entitled, "Axial Piston Pump." The pump per se forms no part of the present invention, therefore, only a general description will be given to facilitate the understanding of this invention.

The pump 20 includes a casing 21 which forms a chamber 22 for the rotatable reception of a cylinder barrel 23. This cylinder barrel has one end in slidable engagement with the valve surface of a head 24 in which arcuate inlet and outlet ports 25 and 26 are formed. The head also has threaded openings 27 and 28 for the reception of conductors for conveying fluid to and from the pump. Opening 27 constitutes an inlet and communicates with a hollow pintle device 29 which projects from the head into the interior of the cylinder barrel and is provided with a port 30 at its inner end, this port registering during part of the revolution of the cylinder barrel with ports 31 in the cylinder barrel which ports communicate with piston chambers 32 also formed in the cylinder barrel.

In the pump illustrated, the piston chambers 32 include primary and secondary sections 33 and 34, the ports 31 entering the primary sections and serving as both inlet and outlet ports therefor. On the opposite side of the pintle 29 from the port 30, the pintle is provided with a passage 35 which communicates with the arcuate inlet port 25 formed in the head 24, the pintle serving to separate the fluid discharged from the primary sections 33 of the piston chambers 32 from that flowing into the interior of the pintle 29. The secondary sections 34 of the piston chambers 32 communicate through ports 36, formed in the end of the cylinder barrel 23, with the inlet and outlet ports 25 and 26 in the head 24 when the cylinder barrel revolves. When the secondary sections 34 communicate with the inlet port 25, pistons 37 disposed for movement in the piston chambers 32 are moved outwardly of such chambers to permit fluid to pass from the inlet port 25 into the secondary sections 34 of the piston chambers 32 and, when such chambers communicate with the outlet port 26, the pistons 37 are moved into the piston chambers 32 to expel fluid from the secondary sections 34 into the outlet port 26, from which it is conducted by the threaded opening 28 and a conduit connected therewith.

As the pistons 37 move into and out of the piston chambers 32, as above mentioned, the larger sections of the pistons will draw fluid into and expel it from the larger portions 33 of the piston chambers. These larger portions 33 of the piston chambers and pistons constitute a supercharging section of the pump and supply the inlet port 25 with fluid under a predetermined booster pressure so that the secondary sections 34 of the piston chambers will be fully charged with fluid when they communicate with the inlet port 25.

To move the pistons 37 in the piston chambers 32, the pump is provided with a cam plate 38 which, in this instance, is circular in form and has a smooth surface for engagement by bearing shoes 40 having a universal connection 41 with the pistons. The bearing shoes 40 are retained in engagement with the cam plate 38 by a retaining plate 42 as in the co-pending application mentioned above. To change the angularity of the cam plate 38 and consequently the stroke length of the pistons 37 and the volume of fluid pumped thereby, the cam plate 38 is carried by a yoke or hanger 43 supported in the pump casing for rocking movement, this rocking movement taking place about an axis extending substantially at right angles to the axis of rotation of the cylinder barrel. The cylinder barrel 23 is revolved in the casing by a shaft 44 which is journalled in the casing at the end opposite the head 24 in which the inlet and outlet ports 27 and 28 are formed. It will be obvious from the description thus far given that rotation of the cylinder barrel 23 when the cam plate 38 is inclined relative to the axis of rotation of the cylinder barrel at an angle other than 90° will cause the pistons 37 to move into and out of the piston chambers 32 and draw fluid into the primary and secondary sections 33 and 34 of the piston chambers 32 when communicating with the inlet ports and expel such fluid from the piston chambers 32 when communicating with the outlet ports. This operation is substantially identical with the operation of the pump shown in the co-pending application. Also as in such application, the casing is provided with an exhaust port 45 from which fluid escaping from the piston chambers or intentionally discharged into the interior of the casing 21 may be conducted to a reservoir of the hydraulic system in which the pump is incorporated.

As shown in Figs. 10 and 11, the yoke or cam supporting hanger 43 has a pair of arms provided with rollers 46 and 47, the arms being arranged on opposite sides of the axis of pivotal movement of the hanger. On one side of the casing, a chamber 48 is provided, in registration with the roller 46, for the slidable reception of a spring pressed plunger 50 which engages the roller 46 and tends to swing the hanger 43 in a predetermined direction. Movement of the hanger 43 in this direction tends to dispose the cam plate 38 at the angular position relative to the axis of rotation of the cylinder barrel 23 which will impart the maximum amount of movement to the pistons 37 to cause them to discharge the maximum intended volume of fluid from the pump. The spring pressed plunger 50 constantly urges the hanger 43 and cam plate 38 toward this full volume position.

In registration with the roller 47 at the opposite side of the pivotal axis of the hanger, the casing is provided with the compensator 51 forming the subject matter of the present invention. This compensator 51 includes a sleeve-like body 52 which is disposed in the pump casing 21 and is pinned in place therein by a suitable pin 53. The sleeve-like member 52 provides piston and control chambers 54 and 55, respectively, the former of which opens at one end to the interior of the casing 21 as illustrated in Figs. 10 and 11. This piston chamber 54 is formed for the reception of a piston 56 employed to move the volume varying mechanism or hanger 43 and cam plate 38 of the pump from the full volume position toward a zero volume position, the latter position being one in which the cam plate 38 is substantially at right angles to the axis of rotation of the cylinder barrel 23.

The piston 56 is disposed in engagement with the roller 47 carried by the hanger 43 and, when the hanger is moved toward a full volume position by the spring pressed plunger 50 mentioned above, the piston 56 will be moved to a retracted position in the piston chamber 54. The piston 56 is shown in this position in Fig. 3.

Piston 56 is provided with a chamber which constitutes, in the form of the invention illustrated, a valve chamber 57, passages 58 and 60 being formed in the piston 56 to establish communication between the piston chamber 54 and the valve chamber 57 and between the latter and the interior of the pump casing 21. Such pump casing is connected, as previously described, with the reservoir of the hydraulic system in which the pump is installed. The passages and valve chamber in the piston 56 will establish communication between the piston chamber 54 and such reservoir and, when the passages are open, communication will be directly established between the piston chamber 54 and the reservoir, the interior of the pump casing, the reservoir and connecting passages being hereinafter termed exhaust. The piston 56 has an extension which projects into the piston chamber 54, this extension being slightly reduced to provide a shoulder 61 on the piston. The valve chamber 57 in the piston 56 slidably receives a valve element 62, the stem 63 of which projects from the piston 56 through a partition in the sleeve member 52 and into the control chamber 55 formed in the outer end of the sleeve member. This control chamber 55 is connected, by drilled passages 64 and 65 formed in the sleeve member 52 and casing 21 with the output port 28 of the pump, this port communicating with the hydraulic system through the threaded opening 28 formed in the head 24. It will be obvious that, when the pistons 37 reciprocate in the cylinder barrel 23 and discharge fluid through the port 26, some of this fluid will flow through the passages 64 and 65 to the control chamber 55.

The stem 63 of the valve which projects into the control chamber 55 of the sleeve member 52 is provided with a central internal passage and lateral ports to establish communication between the control chamber 55 and the piston chamber 54. The valve 62 is grooved to provide a land or valve portion 66 which is so located on the valve that, in one position thereof relative to the piston 56, it will prevent communication between the end of the compensator piston chamber 54 and either of the passages 60 extending to exhaust or the central passage in stem 63 leading to the interior of the control chamber 55. When the valve 62 is so positioned, the compensator piston 56 and the volume varying mechanism 43 will be blocked against movement. The valve stem 63 is provided with an annular flange 67 which is so located on the stem 63 that it will be disposed in the inner portion of the compensator piston chamber 54. The diameter of flange 67 is such that it fits loosely in chamber 54 and a coil spring 68 is arranged between this annular flange and the shoulder 61 formed on the compensator piston 56. This spring 68 tends to urge the valve 62 in a direction relative to the compensator piston 56 to dispose the valve or land 66 in such a position that communication will be established between the compensator piston chamber 54 and exhaust. When the valve 66 is in this position, the plunger means 50 for moving the volume varying mechanism including hanger 43 of the pump will be free to move such mechanism toward a full volume position in which the compensator piston 56 is fully retracted in the chamber 54 therefor. It will occupy this position as long as the chamber 54 is vented to exhaust or no fluid pressure is supplied thereto.

Figure 4:
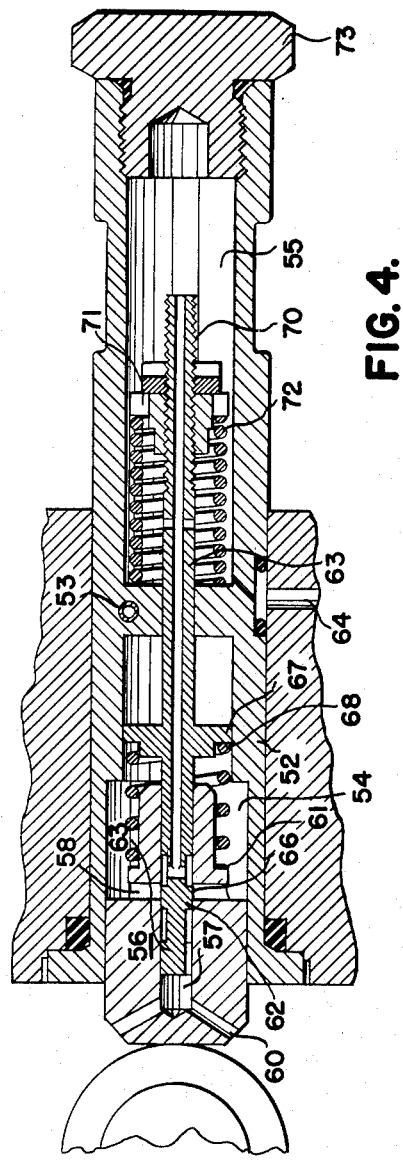
Fig. 4 is a similar view showing the compensator parts in a zero volume position.
Figure 5:
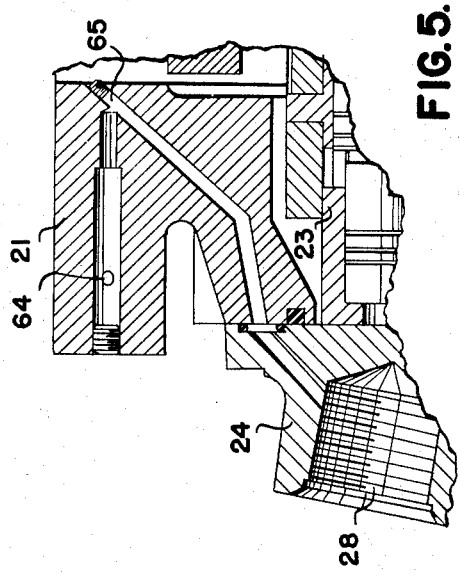
Fig. 5 is a somewhat diagrammatic view showing the passage which extends from the pump output port to the inlet of the compensator.

It will be noted from Figs. 3 and 4 that the valve stem 63 is formed with screw threads 70 at the end portion in the control chamber 55 and a nut or other shoulder providing member 71 is applied to the threads for adjustment longitudinally of the valve stem. Nut 71 engages one end of a relatively weak coil spring 72 the opposite end of which is disposed in engagement with the portion of the sleeve which separates the compensator piston and control chambers 54 and 55. This spring 72 also tends to move the valve 66 outwardly of the valve chamber 57 in the compensator piston 56. The outer end of the sleeve member 52 receives a plug 73 which closes the open end of the control chamber 55 and prevents the escape of fluid therefrom.

It will be observed from an inspection of Figs. 3 and 4 that the end of the valve 66 disposed in the valve chamber 57 is exposed to exhaust pressure, that is, the pressure existing in the interior of the pump casing 21 and consequently the reservoir with which such casing interior communicates. It will also be observed that the opposite end of the valve stem 63 is exposed to the fluid pressure existing in the control chamber 55. Since this chamber 55 is in open communication with the output port 28 of the pump through passages 64 and 65, the same pressure will exist in the control chamber 55 as obtains in such pump output port 28. This pressure will tend to move the valve stem 63 and valve 66 in opposition to the springs 68 and 72 into the valve chamber 57 and relative to the compensator piston.

When the valve 66 is so moved, the land thereon will be disposed in a position so that a groove at one side thereof will establish communication between the inner end of the compensator piston chamber 54 and the central passage in the valve stem 63 which, in turn, communicates with the control chamber 55. Fluid at the pressure of the output port 28 of the pump may then flow from the output port 28 through the passages 65 and 64, chamber 55 and the central passage in stem 63 to the interior of the compensator piston chamber 54 and be applied to the compensator piston 56 to move it and the volume control mechanism with which it is engaged, toward a zero volume position. Since the flange 67 on the valve stem 63 has equal opposed areas exposed to the pressure in the compensator piston chamber 54, the pressure in this chamber 54 will have no effect on the valve 66 and the pressure applied to the end of the stem 63 in chamber 55 will be effective to tend to move the valve 66 in the direction of movement of the piston 56, therefore, as the pressure fluid moves the piston 56, the relation of the valve 66 therewith is maintained. The spring 68 is a relatively short stiff spring which will offer considerable resistance to the movement of the valve 66 in a direction to admit fluid to the compensator piston chamber 54. It will, therefore, require the pressure in the pump output port to increase to a relatively high value, for example, 2800 p. s. i. in a pump set for operation at 3000 p. s. i., before the valve 66 moves to a position to admit fluid to the compensator piston chamber 54 and initiate movement of the volume varying mechanism toward zero volume position. A pressure-volume curve is graphically shown in Fig. 12. The differential pressure, indicated by lines A—B in Fig. 12, between the value at which the valve starts to open and the value which will place the volume varying mechanism in zero volume position when no fluid is required by the system is determined entirely by the spring 72. The pressure at which the flow of fluid to the compensator piston chamber 54 is initiated and volume reduction starts may be changed by the adjustment of the nut 71 on the valve stem 63.

When the spring 72 is compressed sufficiently to exert a force which will interrupt further movement of the valve 66 into the valve chamber 57, the flow of fluid into the compensator piston chamber 54 will be interrupted and the piston 56 will then become stationary until the pressure changes. If the pressure should again start to increase, the valve 66 will be moved to admit more fluid to the compensator piston chamber 54 and the piston 56 will resume its movement toward zero volume position. If the pressure should start to fall, spring 72 will move the valve 66 outwardly in the valve chamber 57 and vent the chamber 54 to exhaust. The volume varying mechanism will then start to move toward a full volume position.

It is again pointed out that, as the output pressure of the pump increases, springs 68 and 72 tend to resist movement of the valve stem 63 and valve 66 relative to the piston 56, spring 72 offering very slight resistance since it is a relatively long, weak spring and the potential movement of the valve 66 is slight. When the pressure approaches that for which the compensator 51 has been adjusted and the valve 66 and stem 63 have moved far enough relative to the piston 56 to establish communication between the output port 28 and the piston chamber 54 fluid under pressure from the output port 28 will flow into the piston chamber 54 and cause the piston 56 to move in the same direction as the valve 66 is moved by the fluid pressure. While fluid is being admitted to the piston chamber 54, the valve 66 and piston 56 move substantially in unison unless the pump output pressure rapidly varies due to sudden changes in requirements in the hydraulic system. If the requirements are suddenly decreased, the output pressure will increase rapidly and the valve 66 will open wider permitting fluid flow to the piston chamber 54 to increase. Due to this increase, the piston 56 will quickly follow the valve 66 and reduce the pump volume. When the system pressure decreases due to increased requirements, the valve 66 is moved relative to the piston by the springs 68 and 72 and communication between the output port 28 and the piston chamber 54 is interrupted. When the springs move the valve far enough, communication will be established between the piston chamber 54 and exhaust and the plunger 50 will then move the volume varying mechanism toward full volume position.

One of the features of the invention is the provision of two springs, one of which primarily controls the pressure to a predetermined value at which the compensator commences to operate and the other controls the difference between that value and the value at which the pump is fully compensated.

While the form of embodiment of the present invention as herein disclosed constitutes a preferred form, it is to be understood that other forms might be adopted, all coming within the scope of the claim which follows:

In a pressure compensator for a hydraulic pump of the type having a movable volume varying member and means tending to urge the same toward full volume position, means forming a piston and spring chambers; a piston disposed for movement in said piston chamber adapted to be operatively engaged by said volume varying member; said piston forming a valve chamber and passages extending from said valve chamber to the piston chamber and to exhaust; a valve element disposed for movement in said valve chamber, said valve element forming a passage extending between said valve chamber and said spring chamber; means forming a high pressure passage adapted to establish communication between the output port of said pump and said spring chamber, said valve element projecting into and including means exposed to fluid pressure in said spring chamber, said valve element blocking communication between said piston chamber and exhaust and between said spring chamber and said high pressure passage in one position and establishing communication between said piston chamber and exhaust through said piston passages in a second position, said valve element blocking said piston passages leading to exhaust and establishing communication between said piston and spring chambers in a third position; a relatively strong spring between said piston and valve element urging the latter toward said second position, a predetermined rise in fluid pressure in said spring chamber moving said valve element against the force of said strong spring toward said third position to admit fluid pressure from said spring chamber to said piston chamber to move said piston toward full volume position, said valve element remaining in said third position during such movement of said piston; a relatively weak spring between a wall of said spring chamber and a portion of said valve element, said second resilient means tending to oppose movement of said valve element by the fluid pressure in said spring chamber, and means for adjusting the spring effect of said relatively weak spring.

References Cited in the file of this patent
UNITED STATES PATENTS

| | | |
|---|---|---|
| 2,214,552 | Ferris | Sept. 10, 1940 |
| 2,299,234 | Snader et al. | Oct. 20, 1942 |
| 2,299,235 | Snader et al. | Oct. 20, 1942 |
| 2,621,632 | Ifield | Dec. 16, 1952 |
| 2,658,483 | Harris | Nov. 10, 1953 |
| 2,713,312 | Shaw et al. | July 19, 1955 |
| 2,754,806 | Funston | July 17, 1956 |

FOREIGN PATENTS

| | | |
|---|---|---|
| 885,907 | France | June 15, 1943 |